(12) United States Patent
Gutt

(10) Patent No.: US 9,785,948 B1
(45) Date of Patent: Oct. 10, 2017

(54) ON-LINE TASK ADVISOR

(75) Inventor: Dale G. Gutt, Plano, TX (US)

(73) Assignee: CA, Inc., New York, NY (US)

( * ) Notice: Subject to any disclaimer, the term of this patent is extended or adjusted under 35 U.S.C. 154(b) by 3438 days.

(21) Appl. No.: 10/614,998

(22) Filed: Jul. 8, 2003

(51) Int. Cl.
*G06Q 30/00* (2012.01)
*G06Q 10/06* (2012.01)

(52) U.S. Cl.
CPC .......... *G06Q 30/016* (2013.01); *G06Q 10/06* (2013.01)

(58) Field of Classification Search
CPC .............................. G06Q 30/016; G06Q 10/06
USPC ...................................................... 705/1, 10
See application file for complete search history.

(56) References Cited

U.S. PATENT DOCUMENTS

| | | | | |
|---|---|---|---|---|
| 5,168,444 | A | * | 12/1992 | Cukor et al. ...................... 705/1 |
| 5,360,069 | A | * | 11/1994 | Schmuck et al. ............. 166/383 |
| 5,515,492 | A | * | 5/1996 | Li et al. ......................... 715/744 |
| 5,596,750 | A | * | 1/1997 | Li et al. ......................... 718/101 |
| 5,630,069 | A | * | 5/1997 | Flores et al. ................. 705/7.27 |
| 6,101,481 | A | * | 8/2000 | Miller ............................... 705/9 |
| 6,445,968 | B1 | * | 9/2002 | Jalla ............................... 700/101 |
| 8,271,882 | B2 | * | 9/2012 | Botscheck et al. ........... 715/738 |
| 2001/0044738 | A1 | * | 11/2001 | Elkin et al. ....................... 705/8 |
| 2002/0007300 | A1 | * | 1/2002 | Slatter .............................. 705/9 |
| 2002/0032590 | A1 | * | 3/2002 | Anand et al. ..................... 705/7 |
| 2002/0055849 | A1 | * | 5/2002 | Georgakopoulos et al. ..... 705/1 |
| 2002/0078007 | A1 | * | 6/2002 | Herrero ............................ 707/1 |
| 2003/0061266 | A1 | * | 3/2003 | Ouchi .......................... 709/106 |
| 2003/0115073 | A1 | * | 6/2003 | Todd et al. ....................... 705/1 |

FOREIGN PATENT DOCUMENTS

WO    WO 01/88757    * 11/2001    ............. G06F 17/30

OTHER PUBLICATIONS

Borland, Borland Together Control Center—"Accelerate Your Productivity".*
Borland®, "Borland® Together® ControlCenter™—Giving Developers the Tools for Success," 2 pgs, Jun. 19, 2003.
Borland®, "Borland® Together® ControlCenter™ Accelerate Your Productivity," 2 pgs.
Borland®, "Borland® Together® ControlCenter™—Features: Borland® Together® ControlCenter™," 1 pg, Jun. 20, 2003.
Borland®, "Borland® Together® ControlCenter™—What's New in Borland® Together® ControlCenter™ 6.0," 1 pg, Jun. 20, 2003.

* cited by examiner

*Primary Examiner* — Carrie S Gilkey
(74) *Attorney, Agent, or Firm* — Pillsbury Winthrop Shaw Pittman LLP

(57) ABSTRACT

A method for online task advising comprises loading a customizable script, the script comprising a task definition. A task instance is created based, at least in part, on the task definition. The task instance comprises a plurality of steps and each step comprises a description and a status. The status of one of the steps is updated based, at least in part, on a received command from a client, an associated one or more actions, or another step.

32 Claims, 3 Drawing Sheets

ON-LINE TASK ADVISOR

TECHNICAL FIELD

This invention relates in general to business computing, and more specifically, to a system and method for online task assistance.

BACKGROUND

As business processes and computing tasks become more complex, users often become confused as to the order, priority, and requirements of steps to be performed to complete the task. Conventional "to do" lists provide the client with a basic understanding of items to be completed during the course of a project through scheduling applications that display these "to do" lists.

SUMMARY

This disclosure provides a system and method for online task advising. In one embodiment, a method for online task advising comprises loading a customizable script, the script comprising a task definition. A task instance is created based, at least in part, on the task definition. The task instance comprises a plurality of steps and each step comprises a description and a status. The status of one of the steps is updated based, at least in part, on a received command from a client, an associated one or more actions, or another step.

BRIEF DESCRIPTION OF THE DRAWINGS

The present disclosure is best understood from the detailed description which follows, taken in conjunction with the accompanying drawings, in which.

DETAILED DESCRIPTION

Figure 1:
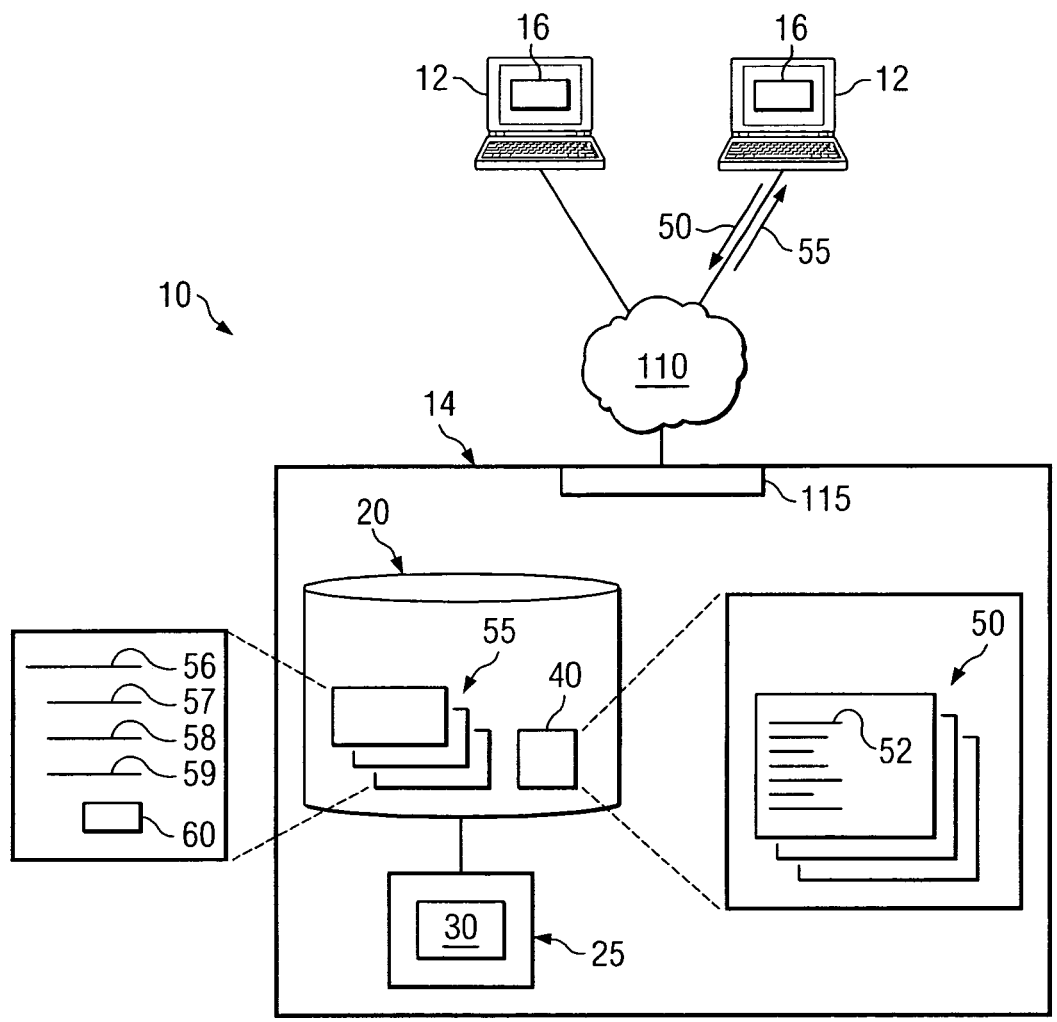
FIG. 1 is a block diagram illustrating an online task advisor according to one embodiment of the present disclosure.

FIG. 1 illustrates a software development environment 10. At a high level, environment 10 is a client/server environment comprising at least one client 12 and a server 14, but may also be a standard computing environment or any other suitable environment. In general, environment 10 comprises a system for providing step-by-step instructions to client 12 for completing a particular business or development task based on a customizable script 50. Environment 10 automatically updates the status of each step based on received commands from client 12 and other appropriate criteria. The term "automatically," as used herein, generally means that the appropriate processing is substantially performed by environment 10. It should be understood that automatically further contemplates any suitable user interaction with environment 10. In one embodiment, environment 10 may be used for developing software using the Java programming language.

Each client 12 may include input devices, output devices, mass storage media, processors, memory, interfaces, communication ports, or other appropriate components for developing software and processing the step-by-step instructions communicated by server 14. It will be understood that there may be any number of clients 12 coupled to server 14. As used in this document, client 12 is intended to encompass a personal computer, workstation, network computer, kiosk, wireless data port, personal data assistant (PDA), one or more processors within these or other devices, or any other suitable processing device. "Client 12" and "user of client 12" may be used interchangeably without departing from the scope of this disclosure. For example, client 12 may comprise a computer that includes an input device, such as a keypad, touch screen, mouse, or other device that can accept information, and an output device that conveys information associated with the operation of server 14 or clients 12, including digital data, visual information, or customizable scripts 50. Both the input device and output device may include fixed or removable storage media such as a magnetic computer disk, CD-ROM, or other suitable media to both receive input from and provide output to users of clients 12 through a graphical user interface (GUI) 16.

Figure 2:
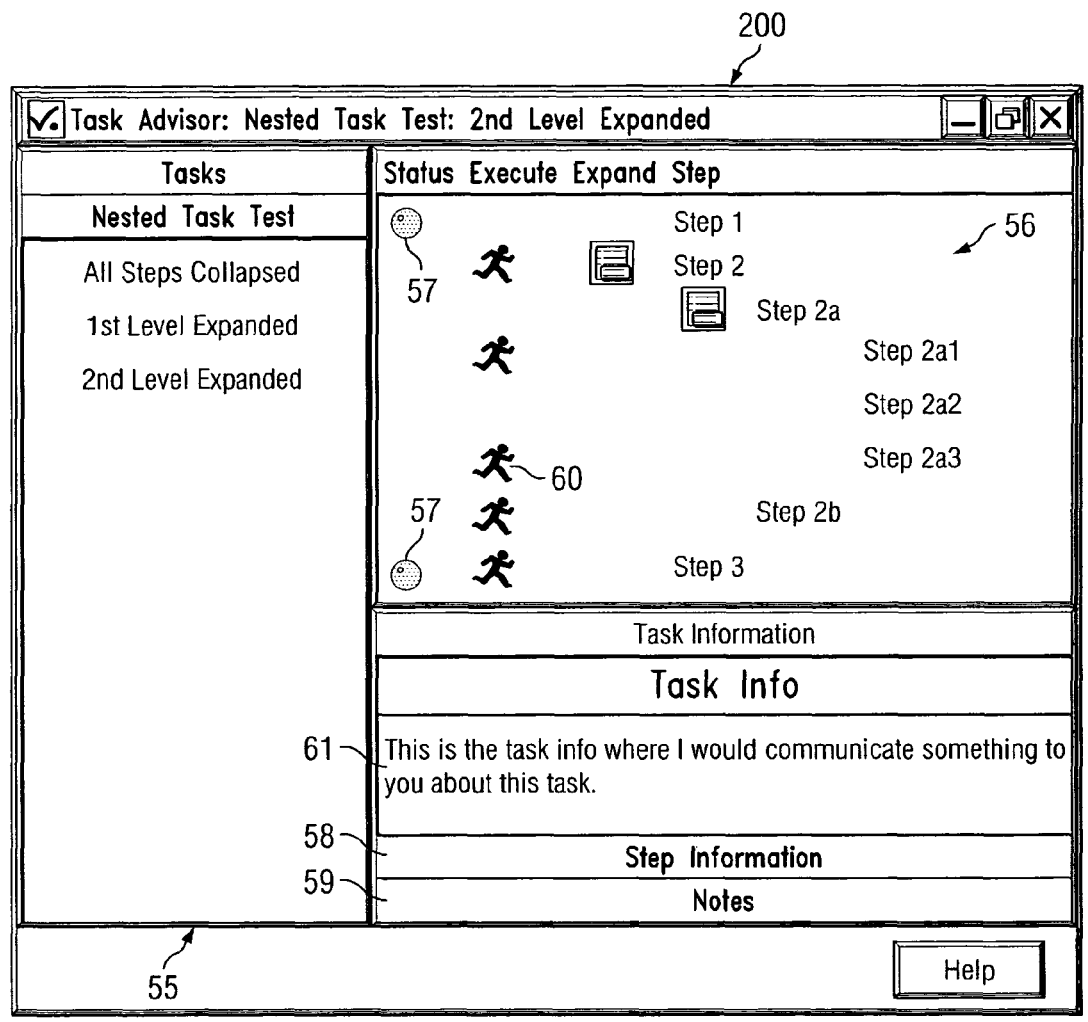
FIG. 2 is a block diagram illustrating a GUI according to one embodiment of the present disclosure.

GUI 16 comprises a graphical user interface operable to allow the user of client 12 to interface with environment 10 for software development (illustrated in FIG. 2 as one embodiment). Generally, GUI 16 provides the user of client 12 with an efficient and user-friendly presentation of data provided by system 10, such as step-by-step instructions. GUI 16 may comprise a plurality of displays having interactive fields, pull-down lists, and buttons operated by the user. In one example, GUI 16 presents the step-by-step instructions and receives commands from client 12. It should be understood that the term graphical user interface may be used in the singular or in the plural to describe one or more graphical user interfaces and each of the displays of a particular graphical user interface. Further, GUI 16 contemplates any graphical user interface, such as a web browser, that processes information in environment 10 and efficiently presents the information to the user. Server 14 can accept data from client 12 via the web browser (e.g., Microsoft Internet Explorer or Netscape Navigator) and return the appropriate hypertext markup language (HTML) or extensible markup language (XML) responses.

Server 14 includes memory 20 and processor 25 and comprises an electronic computing device operable to receive, transmit, process and store data associated with environment 10. For example, server 14 may comprise a general-purpose personal computer (PC), a Macintosh, a workstation, a Unix-based computer, a server computer, or any other suitable device. According to one embodiment, server 14 may comprise a web server. In short, server 14 may comprise software and/or hardware in any combination suitable to assist client 12 in the completion of any business or other suitable task such as, for example, development of one or more pieces of software. For example, server 14 may generally provide object management capabilities, integrated development environment (IDE) capabilities, relationship management capabilities, component management capabilities, configuration management capabilities, and/or other suitable functionality and capabilities operable to support client 12 in developing software. For example, server 14 may operate to assist a user of client 12 in the development of Java applications, Java applets, Enterprise Java Beans and Java components.

Server 14 may also support an online development advice capability. More specifically, various procedures may have an associated automated assistant for walking client 12 through various steps related to completing the particular task. For example, client 12 may receive assistance with the generation of a test harness for a Java component developed using server 14 through the use of an advising engine 30 providing client 12 with needed and desired steps for completing the task. As described in more detail below, the present disclosure contemplates that advising engine 30 may be stored in memory 20 and may be executed or processed by processor 25. FIG. 1 only provides one example of a computer that may be used with the disclosure. The present disclosure contemplates computers other than general purpose computers as well as computers without conventional operating systems. As used in this document, the term "computer" is intended to encompass a personal computer, workstation, network computer, or any other suitable processing device. Computer server 14 may be adapted to execute any operating system including UNIX, Windows, or any other operating system.

Server 14 may also include an interface 115 for communicating with other computer systems, such as client 12, over network 110 such as, for example, in a client-server or other distributed system. In certain embodiments, server 14 receives customizable scripts 50 from network 110 for storage in memory 20. Script 50 may be modified by client 12 or dynamically as appropriate. Network 110 facilitates wireless or wireline communication between computer server 14 and any other computer. Network 110 may communicate, for example, Internet Protocol (IP) packets, Frame Relay frames, Asynchronous Transfer Mode (ATM) cells, voice, video, data, and other suitable information between network addresses. Network 110 may include one or more local area networks (LANs), radio access networks (RANs), metropolitan area networks (MANs), wide area networks (WANs), all or a portion of the global computer network known as the Internet, and/or any other communication system or systems at one or more locations. Generally, interface 115 comprises logic encoded in software and/or hardware in a suitable combination and operable to communicate with network 110. More specifically, interface 115 may comprise software supporting one or more communications protocols associated with communications network 110 or hardware operable to communicate physical signals.

Memory 20 may include any memory or database module and may take the form of volatile or non-volatile memory including, without limitation, magnetic media, optical media, random access memory (RAM), read-only memory (ROM), removable media, or any other suitable local or remote memory component. In this embodiment, memory 20 includes at least script table 40, but may also include any other appropriate data.

Script table 40 stores one or more customizable scripts 50. Script table 40 may receive script 50 via interface 115 or from another process running on server 14. Script table 40 may be of any suitable format including XML documents, flat files, comma-separated-value (CSV) files, SQL tables, relational database tables, and others. Script 50 comprises any executing file including at least one task definition 52, which describes a business or computing task, and operable to be processed by server 14. Script 50 may be created by client 12 or loaded from a template and subsequently customized. Customizable script 50 may be in any electronic format such as, for example, an XML document, comma separated value (CSV) file, EFT record, or any other appropriate data format. In one embodiment, XML is used because it is easily portable, human-readable, and customizable. A portion of an example script 50 in XML is illustrated below. It should be understood that this example is for illustrative purposes only and that any customizable and portable language in any suitable format may be used without departing from the scope of this disclosure.

Task definition 52 defines one or more tasks to be accomplished by client 12 to further the progress toward a particular goal. In one embodiment, task definition 52 defines a series of steps that client 12 performs to substantially complete the business task. For example, in a Java software development environment, task definition 52 may assist the creation of a Java component. Further, each task definition 52 may include nested sub-task definitions. As used herein, each means everyone of at least a sub-set of the identified items.

Processor 25 executes instructions and manipulates data to perform the operations of server 14 such as, for example, a central processing unit (CPU), an application specific integrated circuit (ASIC) or a field-programmable gate array (FPGA). Although FIG. 1 illustrates a single processor 25 in server 14, multiple processors 25 may be used according to particular needs, and reference to processor 25 is meant to include multiple processors 25 where applicable. In the embodiment illustrated, server 14 includes advising engine 30 that processes tasks based on customizable scripts 50. Advising engine 30 could include any hardware, software, firmware, or combination thereof operable to present a series of steps to client 12 and automatically update the status of each step and the task overall. Further, advising engine 30 may allow client 12 to edit or customize scripts 50 such that task definition 52 meets certain needs. It will be understood that while advising engine 30 is illustrated as a single multi-tasked module, the features and functionality performed by this engine may be performed by multiple modules such as, for example, a creation module, a processing module, and an editing module. In one embodiment, advising engine 30 loads a task definition 52 from a script 50 and automatically creates a task instance 55 based on definition 52. Further, advising engine 30 and GUI 16, alone or in combination, may comprise at least a portion of an online task advisor operable to present a hierarchical definition of work to be performed, in the form of a series of nested steps 56.

Task instance 55 comprises a working copy of task definition 52 that comprises a series of steps 56 and is operable to maintain status 57 information associated with each step 56. Each task instance may include a task definition 58, as illustrated in FIG. 2. For example, task instance 55 may be an instantiation of task definition 52 or may be a process running on server 14. More specifically, as steps 56 are completed by client 12, task instance 55 maintains the associated status 57 for the completed, in progress and not started steps 56. Multiple tasks instances 55 of a particular task definition 52 may simultaneously exist in environment 10 for various clients 12, with each client having an individual series of steps 56, each with associated status 57.

Each step 56 comprises a fundamental unit of work in a particular operation to be completed or performed as part of task instance 55. As described above, each step 56 includes a status 57, a step description 58, and, where appropriate, a notes field 59. In one embodiment, status 57 may comprise one of "unavailable," "available," "in progress," and "completed." Each description 58 uniquely identifies step 56 to client 12. Notes field 59 allows client 12 to customize step 56 for this particular task instance 55. For example, the user of client 12 may enter a note associated with a particular step 56 to remind him of what has been performed and what still needs to be done in step 56. Step 56 may be a prerequisite of other steps 56 in the task instance 55. In this case, the other steps 56 will have the status "unavailable" until the prerequisite step 56, on which they depend, is updated to "completed." At which time other step 56 is updated to "available". If client 12 attempts to work on a dependent step 56 before the prerequisite step 56 is completed, advising engine 30 may communicate an error to client 12. For illustrative purposes, example XML script 50 may include a first and second step 56. Second step 56 is defined in script 50 as depending on first step 56, "Run the implementation wizard", using an example code segment "<prereq step_name='Run the implementation wizard'></prereq>". Step 56 may optionally include one or more substeps. The substeps may nest to a suitable depth based on task definition 52. For example, a first step 56 may have two substeps that may each have an additional sub-sub-step within them. In general, task instance 55 may include any suitable number of steps 56 and sub-steps.

The substeps are steps 56 that are children of other steps 56 and, therefore, operate similarly to step 56. But, often status 57 of parent steps 56 substantially depends on status 57 of the children or substeps 56. In one embodiment, advising engine 30 may use the following algorithms to process steps and substeps 57: i) if a substep state is updated to "in progress," then the status of the parent step is also updated to "in progress"; ii) if one substep state is "available," but a related substep has the status "in progress," then the status of the parent step is also updated to "in progress"; and iii) the status of the parent step can only be "completed" once all substeps are completed.

Each step 56 may also be associated with an action 60. Generally, action 60 assists client 12 in completing step 56. For example, action 60 may include launching an interactive wizard, executing a batch utility, launching a software application, other similar action 60. In certain embodiments, status 57 of step 56 may not be updated to "completed" until action 60 has been completed. In one example, if action 60 is a wizard presented to client 12, then step 56 is not complete until the wizard is successfully completed by client 12.

In one aspect of operation, memory 20 receives a customized script 50. As described above, customizable script 50 may be received from any appropriate component, internal or external, including, for example, from another computer via network 110. Client 12 then selects a particular task definition 52 to complete. Upon receiving the selection, advising engine 30 loads script 50 and presents it to client 12 through GUI 16. Advising engine 30 then loads and displays one or more steps 56 associated with the selected task instance 55 on GUI 16. For example, environment 10 may display a list of steps 56 and sub-steps associated with task instance 55 to client 12. Client 12 may then select an available step 56 to perform. In one embodiment, the available task instances 55 are associated with development of Java components and the particular steps 56 represent various operations to be performed in completing the creation of a Java component.

If client 12 completes the selected step 56, the associated status 57 of selected step 56 is set to "completed." Advising engine 30 then determines whether the completion of the selected step 56 has satisfied one or more prerequisites 56. For example, completion of a first step 56 may be required for access to a second step 56 based on prerequisites predefined in script 50. In another example, completion of a first and second steps 56 may be required for access to a third step 56. If server 14 determines that one or more additional steps 56 are to become accessible based on prerequisites, advising engine 30 may indicate that the new steps 56 are accessible on GUI 16 through updating the appropriate status 57. For example, advising engine 30 may change the newly accessible steps 56 in GUI 16 from a grayed-out display to a full color display. If client 12 does not complete the selected step 56, but only partially completes step 56, then status 57 associated with the selected step 56 may be set to "in progress." Client 12 may then select another step 56 to begin work on for completing task instance 55 using GUI 16. Client 12 may then continue to complete steps 56 until task instance 55 is complete.

FIG. 2 is a block diagram illustrating an example GUI 200. It will be understood that illustrated GUI 200 is for example purposes only and may be any in appropriate format, layout, or language. According to one embodiment, GUI 200 is presented to client 12 after task instance 55 is generated. Accordingly, GUI 200 includes task instance 55 and one or more steps 56, each step 56 associated with status 57, step description 58, notes 59, action 60, and task description 61. In the illustrated embodiment, task instance 55 includes eight steps 56, of which three are high level steps 56. Illustrated step 56 "2" includes two substeps 56 "2a" and "2b". Illustrated substep 56 "2a" includes three substeps, or sub-substeps, "2a1," "2a2," and "2a3."

Figure 3:
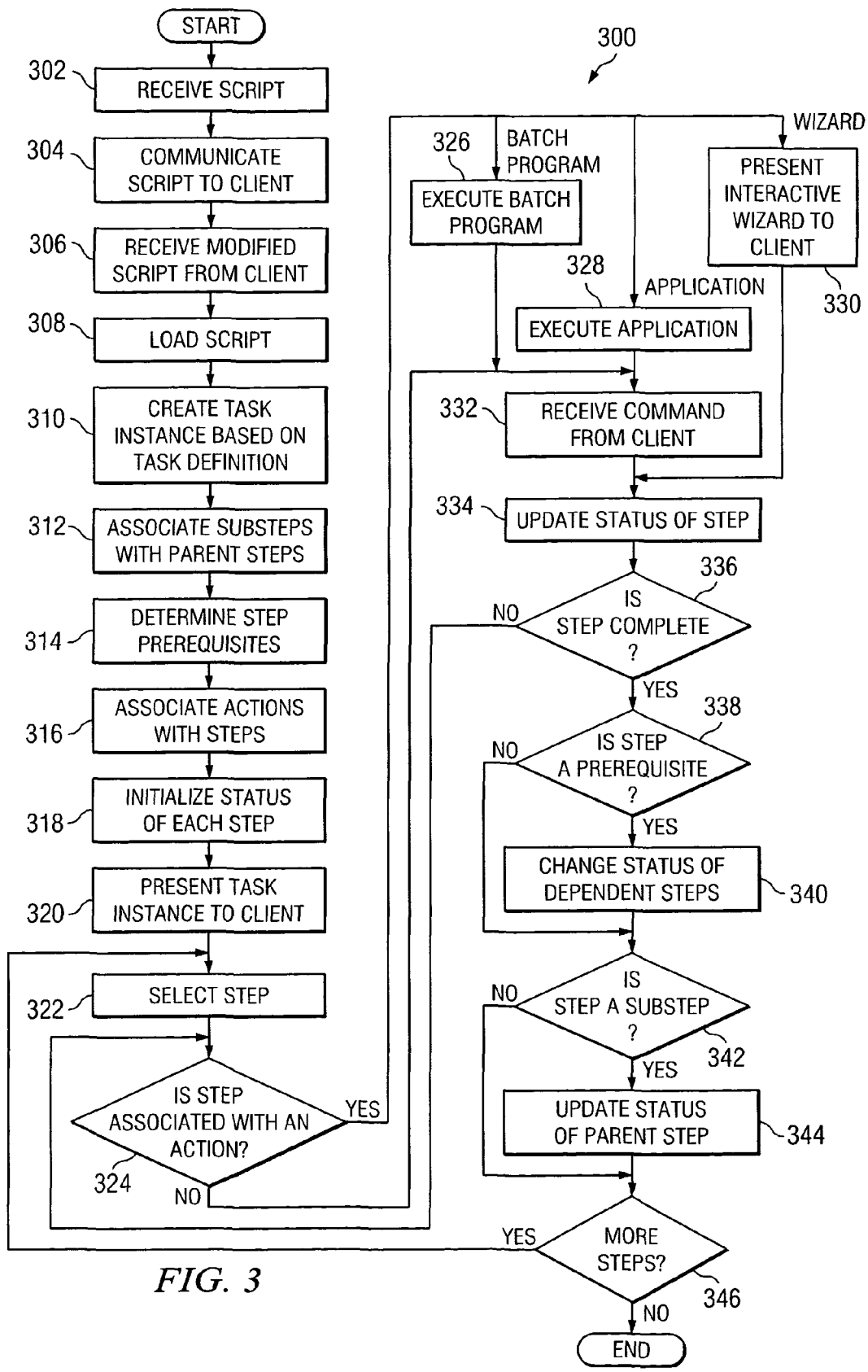
FIG. 3 is a flowchart illustrating a method of operation of online task advisor according to one embodiment of the present disclosure.

FIG. 3 illustrates a flow chart of an exemplary method 300 for providing online task assistance using customizable scripts 50. Method 300 is described in respect to environment 10. However, any other suitable system may use method 300 to provide customizable online task assistance without departing from the scope of this disclosure. Generally, method 300 describes server 14 presenting a task instance 55 to client 12 based on script 50 and updating the steps 56 based on various predefined and dynamic criteria such as, for example, prerequisite or substep status.

Server 14 receives script 50 at step 302. According to one embodiment, advising engine 30 receives script 50 from script table 40 in memory 20. As described above, server 14 may also, for example, receive script 50 from a client 12 via network 110. Upon receiving a request from client 12, advising engine 30 communicates script 50 to a client 12 for customization at step 304. Client 12 may customize script 50, for example, by adding, changing, or removing task definitions 52 in any suitable manner. Once script 50 is customized, server 14 receives the modified script 50 from client 12 at step 306 and stores it in script table 40. After receiving a selection of script 50 from the same or a different client 12, advising engine 30 loads the script and any associated task definitions 52 at step 308.

Once the customized script 50 has been loaded, at step 308, server 14 generates task instance 55 based on a selected task definition 52 in the loaded script 50 at step 310. It will be understood that customization of script 50 may occur contemporaneously with the loading step. At step 312, substeps are associated with parent steps. At step 314, step 56 prerequisites are determined. At step 316, actions are associated with each step 56. At step 318 when task instance 55 is initially created, status 57 for each step 56 is initialized to the appropriate value based on prerequisites and substeps, unless otherwise indicated in task definition 52. For example, if one step 56 has a prerequisite step 56, then the status of the dependent step 56 is initialized to "unavailable." In one embodiment, unavailable steps 56 are grayed-out in GUI 16 and client 12 is prevented from selecting the unavailable steps 56. Alternatively, if client 12 has already created an associated existing task instance 55 for the selected task definition 52, server 14 may load the existing task instance 55 so that client 12 may continue working without restarting. Once task instance 55 is created and initialized to the appropriate values, at step 320 it is presented to client 12 for processing in steps 322 through 346.

Proceeding to step 322, client 12 selects a particular step 56 from task instance 55 to perform. Advising engine 30 then determines if selected step 56 is associated with an action 60 at decisional step 324. If there is no action 60 associated with the selected step 56, then execution proceeds to step 332. Otherwise, advising engine 30 determines if action 60 is, for example, a batch program, an application, or an interaction wizard. If action 60 is a batch program, then advising engine 30 executes the batch program at step 326 or if action 60 is an application, then advising engine 30 executes the application at step 328. Once execution of either action 60 is complete, then execution proceeds to step 332. At step 332, advising engine 30 may receive a command from client 12 to mark the status of step 56. For example, client 12 may decide to return to step 56 and request that the status be updated to "in progress."

Returning to step 324, if advising engine 30 determines that action 60 is an interaction wizard, then advising engine 30 presents the wizard to client 12 in step 330 and execution proceeds to step 334. Whether there is an action 60 associated with step 56 or not, at step 334, server 14 updates the status 57 associated with the step 56 selected at step 322 as appropriate. More specifically, if client 12 has completed the selected step 56, then the associated status 57 is set to "completed." If client 12 has not completed the selected step 56, then status 57 associated with the selected step 56 is set to "in progress." As described above, in certain embodiments status 57 of step 56 may not be updated to "completed" until action 60 has been completed. For example, step 56 may not be marked complete until the wizard was successfully completed by client 12. Once status 57 of the selected step 56 is updated, advising engine 30 determines, either automatically or interactively, whether the step 56 is completed at step 336. If is not complete, then processing returns to 324. After the selected step 56 is completed, advising engine 30 processes the remaining plurality of steps in the task instance 55 to determine if the updated step 56 affects the status of the remaining steps 56.

At decisional step 338, advising engine 30 determines if the completed step was a prerequisite of any other steps 56. Again, dependent steps 56 will have the status "unavailable" until the prerequisite step 56, on which they depend, is updated to "completed." Accordingly, at step 340, advising engine 30 updates the status 57 of substantially all of the dependent steps 56 to "available." Of course, if a particular dependent step 56 also relies on other prerequisite steps 56, then status 57 may not be updated. Once prerequisite processing is completed for the completed step 56, then processing processes any parent steps 56 of the completed step 56. At decisional step 342, advising engine 30 determines if the completed step 56 is a substep of any other steps in task instance 55. If it is, then server 14 may update the status 57 of the parent step or step 56 as appropriate at step 344. Once substep processing is complete, if there are remaining incomplete steps 56 in task instance 55 at decisional step 346, then execution returns to step 322 where the next step 56 is selected. Otherwise, processing ends.

The preceding flowchart and accompanying description illustrate only an exemplary method 300 for server 14 to provide online task assistance using customizable scripts 50. However, environment 10 contemplates server 14 using any suitable technique for performing these tasks. Thus, many of the steps in this flowchart may take place simultaneously and/or in different orders than as shown. Moreover, server 14 may use methods with additional steps, fewer steps, and/or different steps, so long as the methods remain appropriate.

Although the present invention has been described in detail, it should be understood that various changes, substitutions and alterations can be made hereto without departing from the sphere and scope of the invention as defined by the appended claims.

What is claimed is:

1. A method for online task advising that assists a user to complete a task, the method comprising:
   receiving, from a user by a system comprising a hardware processor, a request to customize a task definition of a customizable script in a memory;
   updating, by the system, the task definition based on the request;
   receiving, from a user by the system, a selection of a task definition to be completed, the task definition to be completed being the updated task definition;
   creating, by the system, a task instance based, at least in part, on the selected task definition, the task instance comprising a step associated with completing the task, the step comprising a status indicator;
   receiving, by the system, a selection of the step from a user;
   determining, by the system, whether the selected step is associated with an action;
   responsive to the selected step being associated with the action, by the system:
      executing the action, and
      updating the status indicator of the selected step based on the executed action;
   responsive to the selected step not being associated with the action, by the system:
      presenting the user with the selected step for election whether to complete the selected step,
      receiving, from the user, an indication that the selected step is complete, and
      updating the status indicator of the selected step based on the indication from the user; and
   providing, by the system, the task instance for presentation on a display.

2. The method of claim 1, wherein the status indicator comprises:
   unavailable;
   available;
   in progress; or
   completed.

3. The method of claim 2, wherein the action comprises at least one selected from:
   launching an interactive wizard;
   executing a batch utility; or
   launching an application.

4. The method of claim 2, wherein the task instance further comprises a plurality of additional steps, wherein the additional steps are substeps of the step of the task instance.

5. The method of claim 4, further comprising:
   updating the status indicator of the step in response to updating a status indicator of one of the substeps, wherein the status indicator of the step indicates the step is in progress until status indicators of all of the substeps indicate that the substeps are completed.

6. The method of claim 1, wherein the action is associated with an interactive wizard, and the method further comprises:
   receiving a notification that the interactive wizard was successfully completed, wherein the updating the status indicator of the selected step comprises automatically updating the status indicator to indicate the selected step is complete based on the notification.

7. The method of claim 1, wherein the task instance comprises a plurality of steps associated with completing the task, and wherein at least one step of the plurality of steps is a prerequisite step of at least one other step of the plurality of steps.

8. The method of claim 7, wherein the status indicator of the prerequisite step indicates that the prerequisite step is not complete and, in response to receiving a command from the user to update a second status indicator of the at least one other step to indicate the at least one other step is complete, the method further comprises communicating an error to the user.

9. The method of claim 7, wherein the at least one other step comprises a second status indicator, and the method further comprises:
 initializing the second status indicator of the at least one other step upon creation of the task instance based, at least in part, on the status indicator of the prerequisite step.

10. The method of claim 7, further comprising:
 providing the prerequisite step for display such that the prerequisite step is accessible to be completed; and
 providing the at least one other step for display as inaccessible to be completed until the status indicator indicates that the prerequisite step is complete.

11. The method of claim 1, wherein the customizable script comprises an extensible markup language (XML) document.

12. The method of claim 1, wherein the task instance and the step each further comprise a note field, and the method further comprises:
 receiving a note from the user;
 responsive to the received note being associated with the task instance, adding the received note to the note field in the task instance; and
 responsive to the received note being associated with the step, adding the received note to the note field in the step.

13. The method of claim 1, wherein the customizable script comprises a plurality of task definitions, the plurality of task definitions comprising first and second task definitions to be completed, based, at least in part, on which first and second task instances, respectively, are created, and wherein a step of the first task instance comprises the second task instance as a nested task instance.

14. The method of claim 1, further comprising:
 advising, from an automated assistant, the completion of the step in order to complete the task.

15. The method of claim 1, wherein the request to customize the task definition comprises a request to add, change or remove a task definition from the customized script.

16. The method of claim 1, wherein the customized script is a template.

17. A non-transitory computer readable medium storing computer executable instructions for online task advising that assists a user to complete a task, the instructions when executed configure a system comprising a hardware processor to:
 receive a request from a user to customize a task definition of a customizable script;
 update the task definition based on the request;
 receive, from a user, a selection of a task definition to be completed, the task definition to be completed being the updated task definition;
 create a task instance based, at least in part, on the selected task definition, the task instance comprising a step associated with completing the task, the step comprising a status indicator;
 receive, from a user, a selection of the step;
 determine whether the selected step is associated with an action;
 if the selected step is associated with the action:
  execute the action, and
  update the status indicator of the selected step based on the executed action;
 if the selected step is not associated with the action:
  present the user with the selected step for election whether to complete the selected step,
  receive, from the user, an indication that the selected step is complete, and
  update the status indicator of the selected step based on the indication from the user; and
 provide the task instance for presentation on a display.

18. The computer readable medium of claim 17, wherein the status indicator comprises:
 unavailable;
 available;
 in progress; or
 completed.

19. The computer readable medium of claim 18, wherein the action comprises at least one selected from:
 launching an interactive wizard;
 executing a batch utility; or
 launching an application.

20. The computer readable medium of claim 19, wherein if the action is associated with an interactive wizard or batch utility, the instructions when executed further configure the system to:
 receive a notification that the interactive wizard or batch utility was successfully completed; and
 responsive to the status of the selected step being updated, automatically update the status of the selected step to completed based on the notification.

21. The computer readable medium of claim 17, wherein the task instance comprises a plurality of steps associated with completing the task, and wherein at least one step of the plurality of steps is a prerequisite step of at least one other step of the plurality of steps.

22. The computer readable medium of claim 21, wherein the instructions when executed further configure the system to: communicate an error to the user when the status indicator of the prerequisite step indicates the prerequisite step is not complete and when an update to a second status indicator of the at least one other step is received that indicates the at least one other step is complete.

23. The computer readable medium of claim 17, wherein the customizable script comprises an extensible markup language (XML) document.

24. The computer readable medium of claim 17, wherein the task instance and the step each further comprise a note field, and the instructions when executed further configure the system to:
 receive a note from the user;
 responsive to the received note being associated with the task instance, add the received note to the note field in the task instance; and
 responsive to the received note being associated with the step, add the received note to the note field in the step.

25. The computer readable medium of claim 17, wherein the at least one other step comprises a second status indicator, and the instructions when executed further configure the system to:

initialize the second status indicator of the at least one other step upon creation of the task instance based, at least in part, on the status indicator of the prerequisite step.

26. The computer readable medium of claim 17, wherein the customizable script comprises a plurality of task definitions, the plurality of task definitions comprising first and second task definitions to be completed, based, at least in part, on which first and second task instances, respectively, are created, and wherein a step of the first task instance comprises the second task instance as a nested task instance.

27. The computer readable medium of claim 17, wherein the task instance further comprises a plurality of additional steps, wherein the additional steps are substeps of the step of the task instance.

28. The computer readable medium of claim 27, wherein the instructions when executed further configure the system to:

update the status indicator of the step in response to updating a status indicator of one of the substeps, wherein the status indicator of the step indicates the step is in progress until status indicators of all of the substeps indicate that the substeps are completed.

29. The computer readable medium of claim 17, wherein the request to customize the task definition comprises a request to add, change or remove a task definition from the customized script.

30. The computer readable medium of claim 17, wherein the customized script is a template.

31. A system for online task advising that assists a user to complete a task, the system comprising:

a memory operable to store a customizable script, the customizable script comprising a task definition; and
  a processor, comprising hardware, configured to:
    receive a request from a user to customize the task definition of the customizable script;
    update the task definition based on the request;
    receive, from a user, a selection of a task definition to be completed, the task definition to be completed being the updated task definition;
    create a task instance based, at least in part, on the selected task definition, the task instance comprising a step associated with completing the task, the step comprising a status indicator;
    receive, from a user, a selection of the step;
    determine whether the selected step is associated with an action;
    if the selected step is associated with the action:
      execute the action, and
      update the status indicator of the selected step based on the executed action, and
    if the selected step is not associated with the action:
      present the user with the selected step for election whether to complete the selected step,
      receive, from the user, an indication that the selected step is complete, and
      update the status indicator of the selected step based on the indication from the user; and
  provide the status indicator for presentation on a display.

32. The system of claim 31, wherein the customizable script comprises a plurality of task definitions, the plurality of task definitions comprising first and second task definitions to be completed, based, at least in part, on which first and second task instances, respectively, are created, and wherein a step of the first task instance comprises the second task instance as a nested task instance.

* * * * *